Feb. 21, 1956   W. L. VAN DOREN   2,735,561
BOX DUMPING MACHINE
Filed July 25, 1949   6 Sheets-Sheet 4
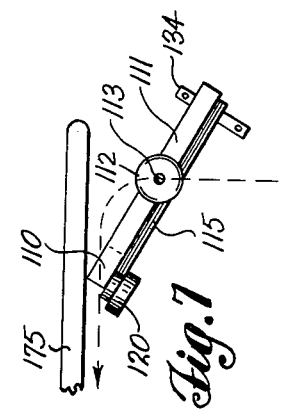
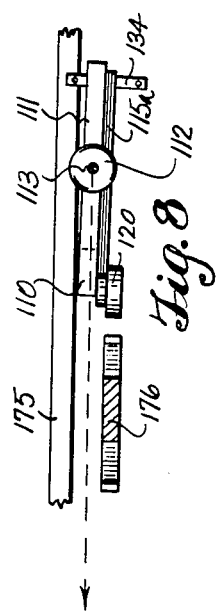
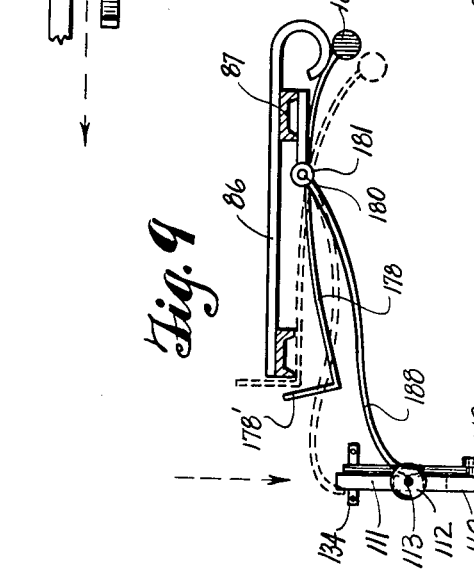
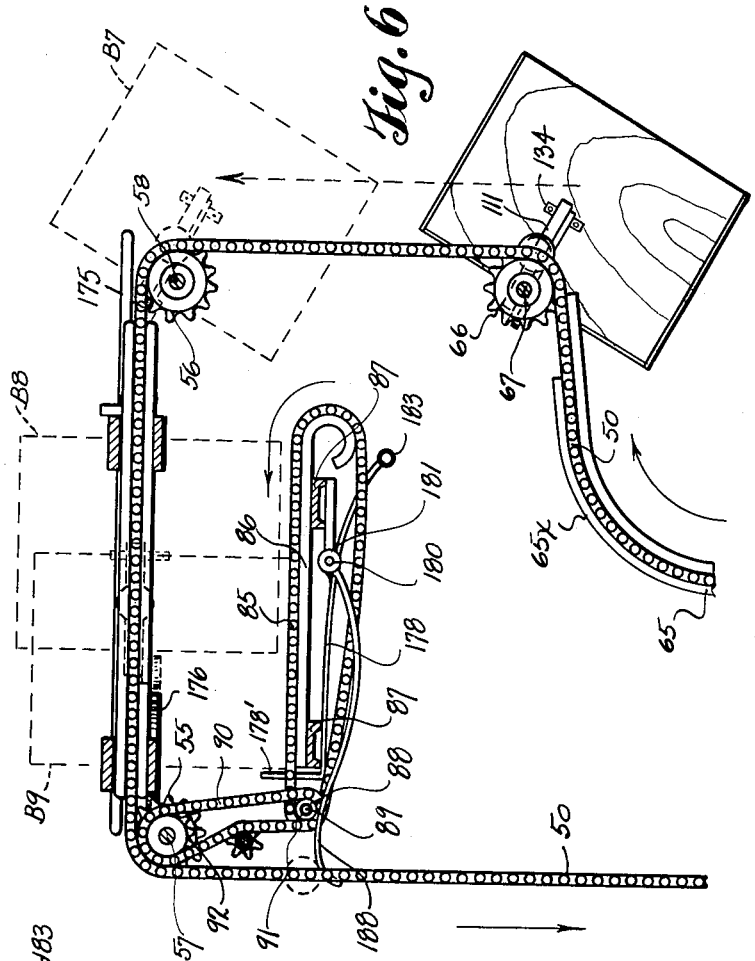
Inventor
WILLIAM L. VAN DOREN
Cook & Robinson
Attorney

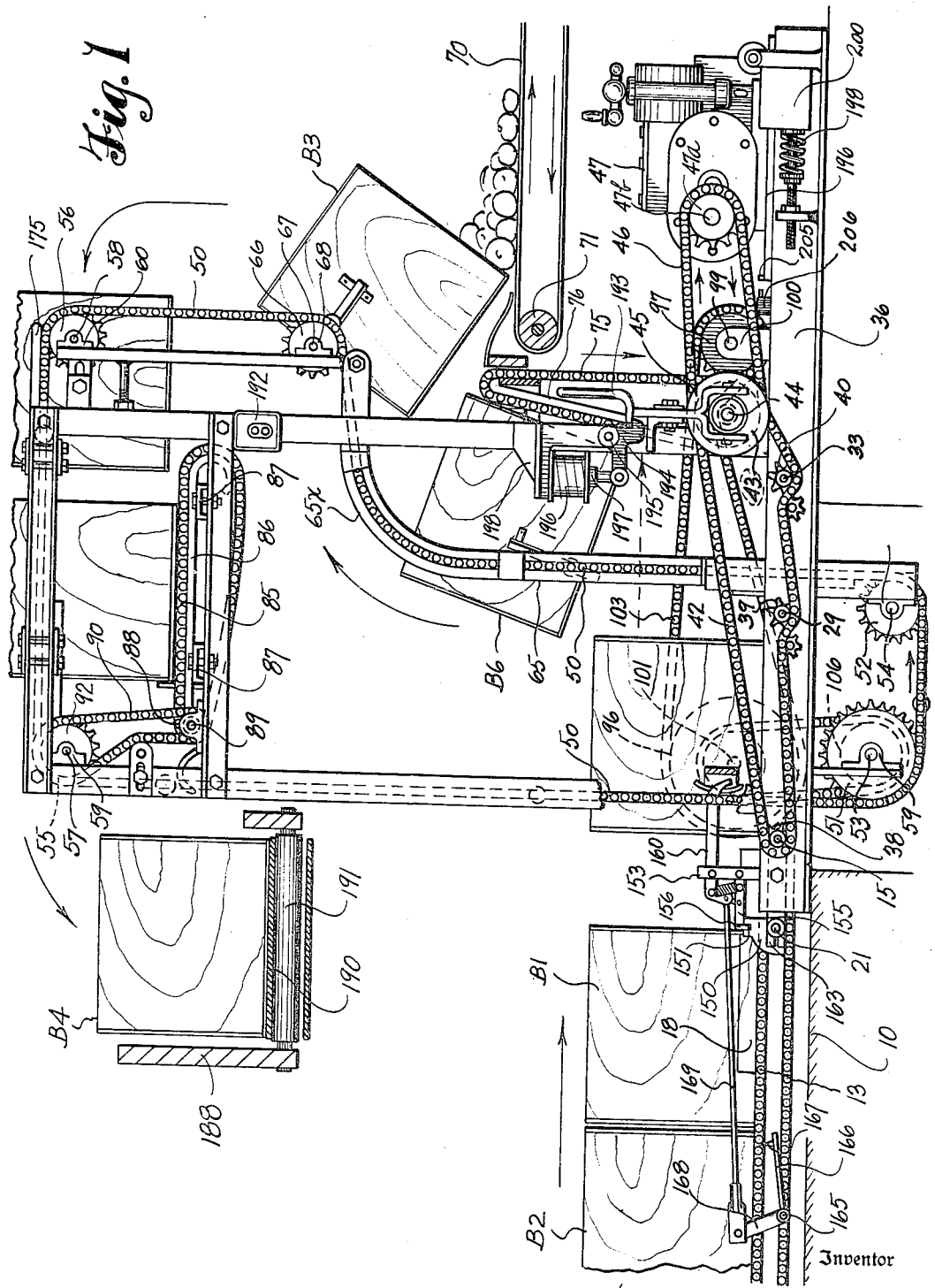

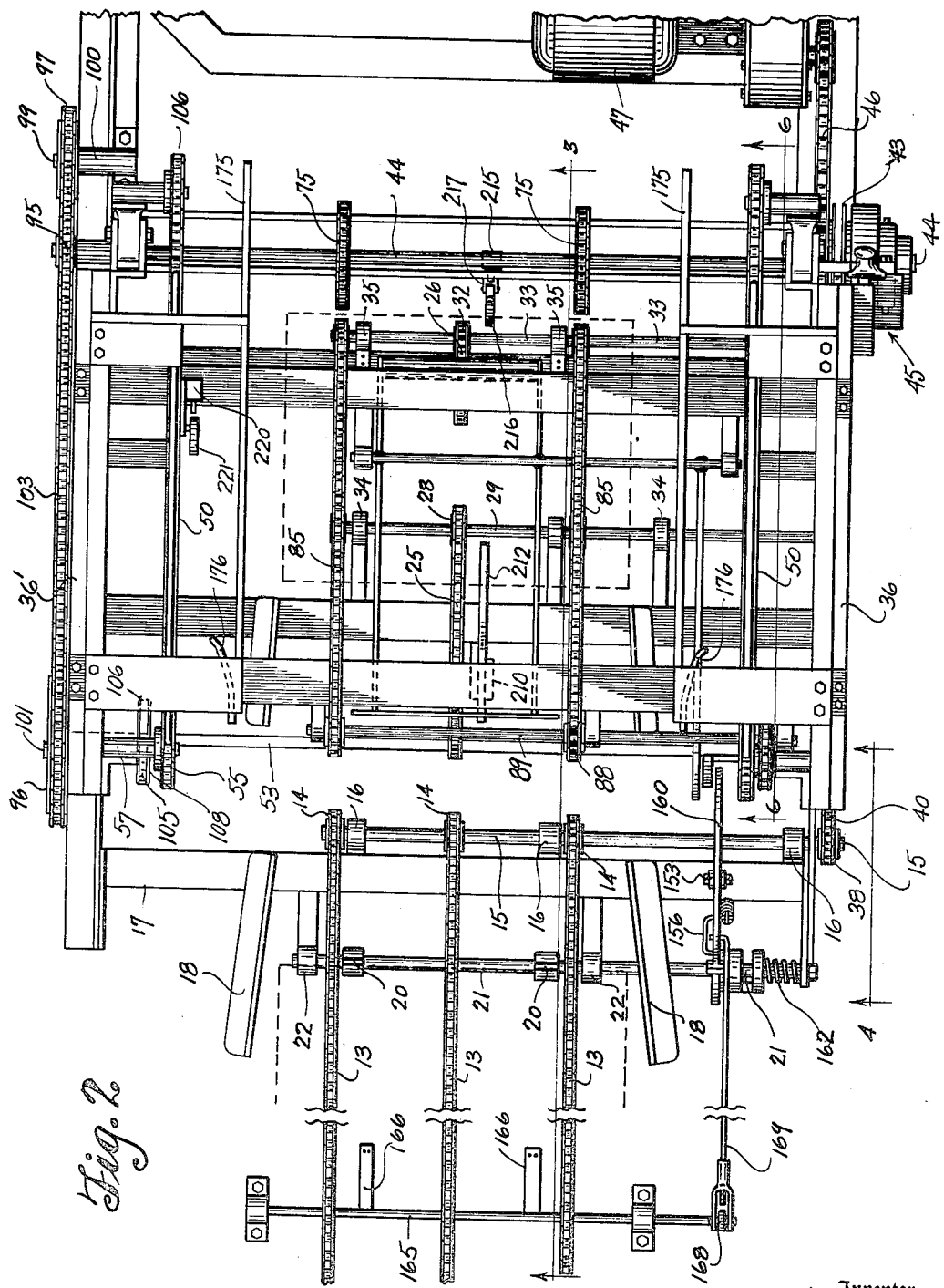

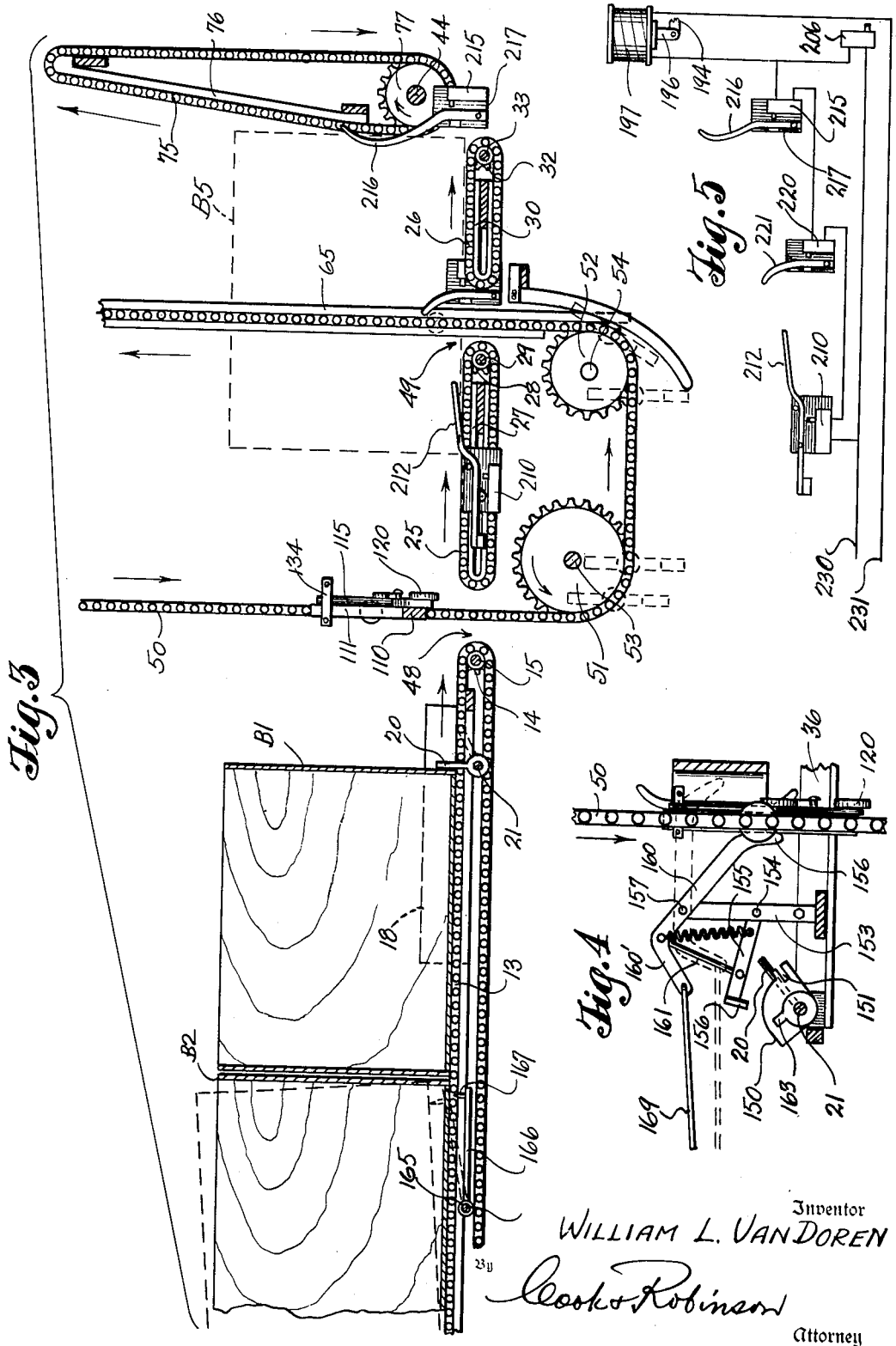

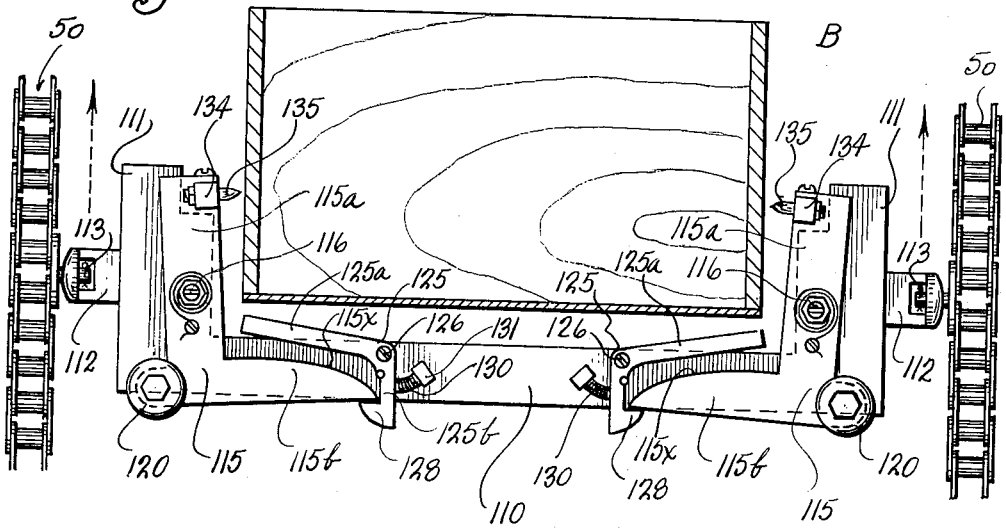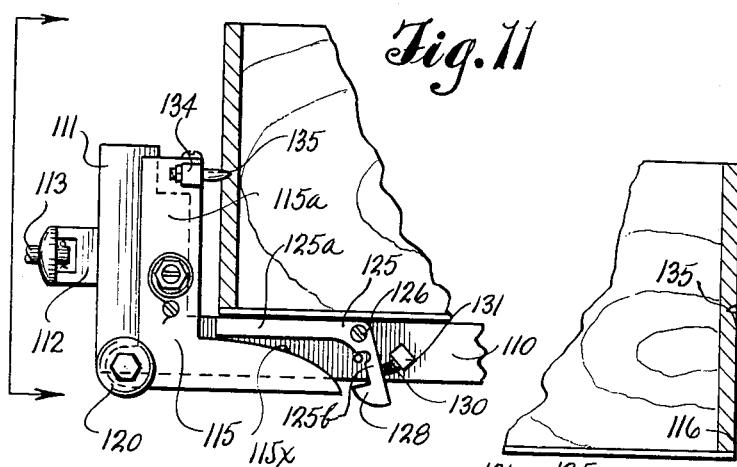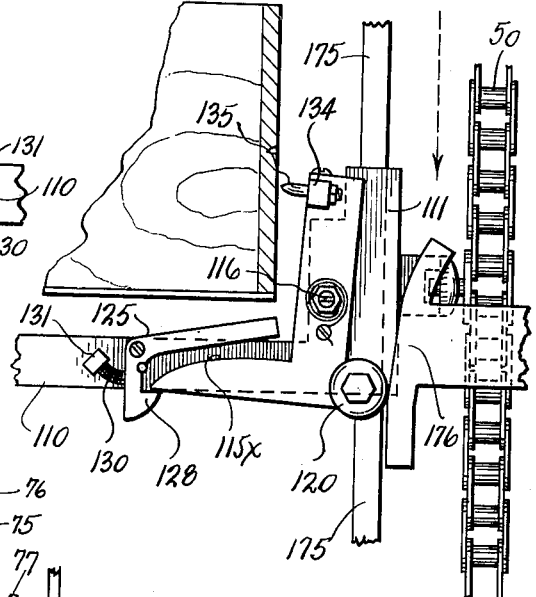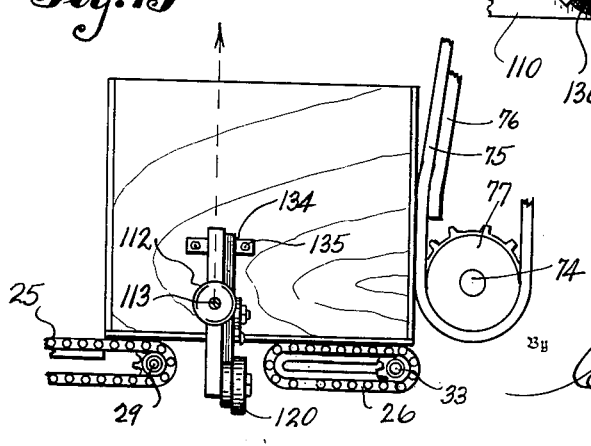

United States Patent Office 2,735,561
Patented Feb. 21, 1956

2,735,561

BOX DUMPING MACHINE

William Louis Van Doren, Wenatchee, Wash.

Application July 25, 1949, Serial No. 106,514

6 Claims. (Cl. 214—311)

This invention relates to machines that, in the art to which they pertain, are known as "box dumping machines," and it has reference more particularly to a machine that is especially designed for use in the fruit packing industry, whereby boxes containing fruit, such as apples, peaches, pears, etc., may be received in timed succession and their contents poured therefrom, onto a conveyor or onto the table of a sorting machine, or the like, and the empty boxes then discharged from the machine.

It is the principal object of this invention to provide a machine of the above stated character whereby boxes of apples, or other fruit, may be raised, and then turned over or dumped in such a manner as to cause their contents to be carefully poured out, to avoid bruising of the fruit and without causing it to be piled up or spilled from the conveyor or sorting table.

A further object of the invention is to provide a mechanism of the above character that is fully automatic in all of its operations of timing the entry, spacing, lifting, dumping and ejecting of the boxes, and which is equipped with control means that causes the machine to be stopped in event of any box becoming out of proper alignment or position that might result in jamming or improper action of the machine.

Further objects of the invention reside in the details of construction of parts, and in their combination, relationship and mode of operation as will hereinafter be fully described.

In accomplishing the above mentioned and other objects of the invention, I have provided the improved details of construction, the preferred forms of which are illustrated in the accompanying drawings, wherein:

Fig. 1 is a side view of a box dumping machine embodied by the present invention and illustrating the conveyance of boxes in succession from a receiving point, through the dumping operation and to the point of discharge.

Fig. 2 is a top, or plan, view of the same, showing, in dotted outline, the position of incoming boxes as held by the timing gate, for timed entry into the machine.

Fig. 3 is a vertical section taken on the line 3—3 in Fig. 2, showing the series of conveyors for bringing boxes into the machine, and the lower portions of box elevating belts.

Fig. 4 is a side view of the latch devices associated with the gate that is operable to synchronize the entry of boxes into the machine with the travel of the box elevating belts and carrier clamps thereon.

Fig. 5 is a view illustrating the arrangement of microswitches associated with the automatic stop mechanism used in combination with the box conveyor driving mechanisms.

Fig. 6 is a vertical section, on the line 6—6 in Fig. 2, showing the upper end portions of the box elevating belts and box back-feeding conveyors.

Fig. 7 is a detail, in side elevation, of a box carrier clamp, indicating a turn in its path of travel.

Fig. 8 is a similar view of a box carrier clamp approaching a clamp releasing means.

Fig. 9 is a detail, in side elevation and vertical section, of the gate mechanism for timing the release of boxes for ejection from the machine.

Fig. 10 is an elevation of one of the box carrier clamps as suspended between the paired and synchronously moving box elevating belts, showing the clamp just prior to its engaging a box.

Fig. 11 is an elevation showing the box securing dog and latch device therefor at one end of the carrier clamp.

Fig. 12 is a detail illustrating the means for and manner of releasing a clamp dog from the box end.

Fig. 13 is an end elevation of a box as disposed on the delivery conveyors just prior to its being picked up by one of the carrier clamps.

Figure 14:
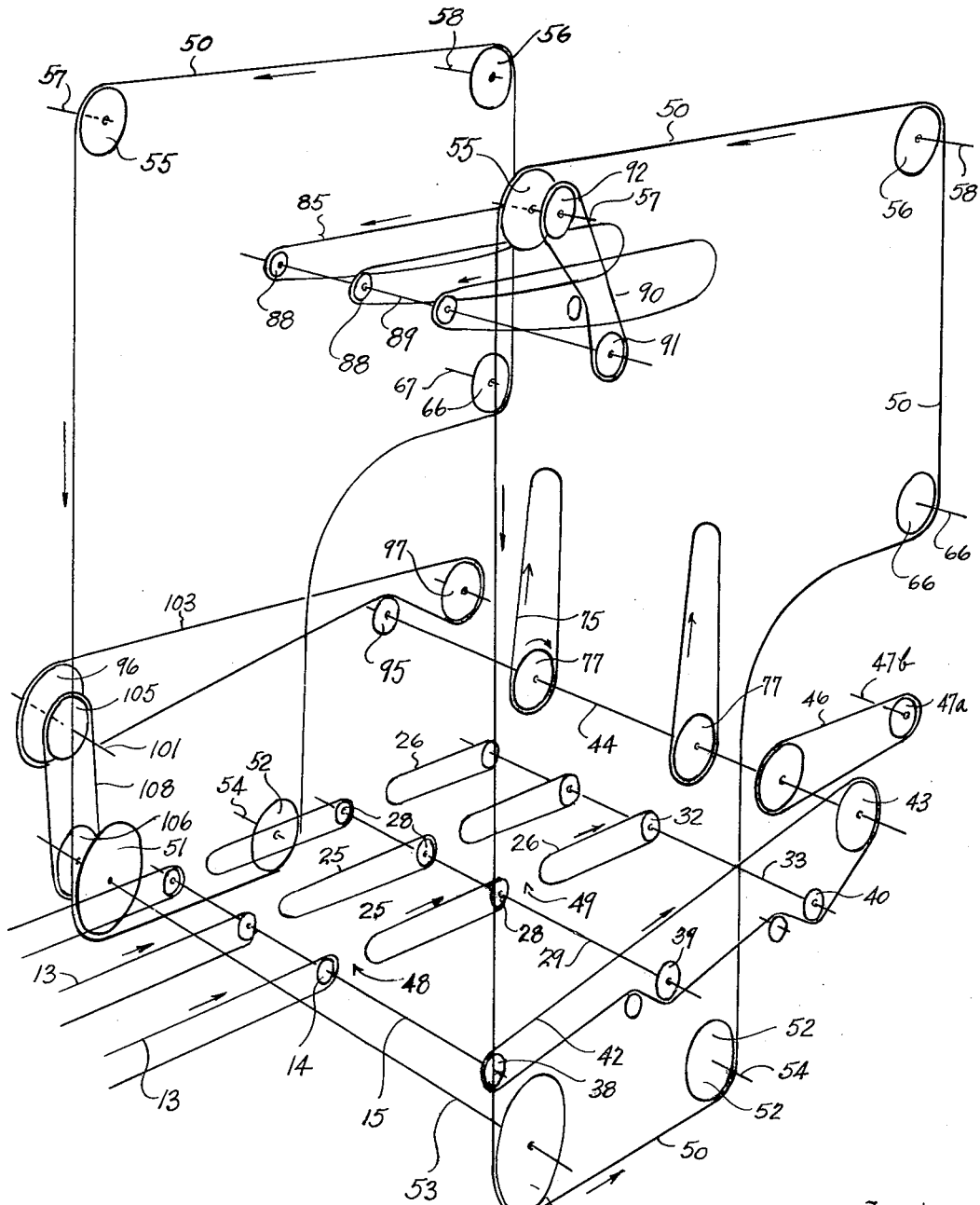
Fig. 14 is a diagrammatic illustration, in perspective view, of the various conveyor belts and driving means therefor.

Briefly described, the present machine comprises various associated mechanisms whereby filled but uncovered boxes of apples, or the like, brought to the machine on floor level conveyors, may be spaced and timed in their entry into the machine, the individual boxes elevated and then turned to a position for pouring the apples carefully from the boxes onto a table or conveyor belt for advancement to the sorting, washing, weighing or to other types of machines; the empty boxes then being conveyed to a point of discharge and, in proper timing, delivered to an off-bearing belt.

The essence of the present invention resides in the provision of a means whereby the dumping of apples, or the like, from boxes may be carried on with rapidity, yet in such careful manner as to avoid the bruising of fruit, or causing it to be piled up on the receiving table or conveyor. Furthermore, to provide a machine in which all operations are automatically effected and safety devices are employed to prevent the jamming of the machine by reason of any box becoming out of proper alignment upon entry or during travel.

In the following specification, the means for the conveyance of boxes to and through the machine will first be described, and this will be followed by a description of the various safety devices and controls for the machine.

Referring more in detail to the drawings:

The path of travel of boxes from a receiving line to a discharge or off-bearing conveyor is best understood by reference to Fig. 1, wherein the machine, shown in side elevation, is shown to be disposed upon a supporting floor or base designated by numeral 10. Two incoming boxes are designated, respectively, by reference characters B1 and B2. A box that has been carried to dumping position is designated at B3, and a box being discharged from the machine onto an off-bearing conveyor is designated by reference character B4. Only those parts of the main frame structure of the machine that are essential to proper understanding have been shown in the drawings, and in some of the views have been omitted for better illustration of parts that would be obscured thereby.

Referring now to Figs. 1 and 2: It is noted that the incoming boxes B1 and B2 are brought up to the machine upon three horizontally extending, parallel conveyor belts 13. These belts extend about sprocket wheels 14 on a horizontal cross-shaft 15, revolubly mounted in bearings 16 fixed to a cross beam 17 as shown in Fig. 2; this beam being a part of the main frame structure of the machine. As the boxes are successively brought to receiving position upon these conveyor chain belts 13, they are conveyed between a pair of laterally spaced, positioning rails 18—18, fixed to the cross beam 17 and set in convergence and in such spacing as to easily receive the incoming boxes between them at their ends of wider spacing and to automatically shift them endwise, under the influence of the advancing belts 13, as may be required to insure their proper disposition for entry into the machine.

As each incoming box is advanced by the conveyor belts 13 to proper position for entry into the machine, it is brought up to a timing gate comprising two transversely aligned stops 20—20, in the form of short lever arms, fixed to and extended upwardly from a cross shaft 21 that is mounted transversely of and directly below the top runs of the conveyor belts 13 and is revoluble in supporting bearings 22 that are fixed to the frame member 17, as shown in Fig. 3.

The stops 20—20 are so disposed that they will be engaged by the forward wall of the entering box, thus to stop advancement of the box for proper timing in its entry relative to the position of the box carrier clamps that are carried by the continuously moving box elevating belts, as will presently be explained. While a box is thus held by the stops 20—20 against advancement, the conveyor belts 13 on which it rests continue to travel and slide beneath the held box.

Normally the cross shaft 21 is held against rotation with the stops extending upright as in Fig. 3. The release of a box as thus held against advancement by the stops 20—20 is effected by permitting the cross shaft to rotate through a partial turn. The latch mechanism for holding the shaft 21 against rotation, and the devices associated therewith for effecting its release will be described in detail after an explanation of the box elevating and dumping means has been given.

Upon the release of an incoming box that has been momentarily checked in its advancement by contact with the stops 20—20, it will be advanced by the belts 13 directly onto a second series of belt conveyors, 25, and from these onto a third series 26, as will be understood by reference to Fig. 3. The belt conveyors of the second and third series are aligned with and are at the same horizontal level as those of the conveyor belts 13.

The conveyor chain belts 25 of the second series operate about tracks or guide rails 27 and extend about and are driven by sprocket wheels 28 on a cross shaft 29. Likewise, the chain belts 26 operate along guide rails 30 and extend about and are driven by sprocket wheels 32 on a cross shaft 33.

The cross shafts 29 and 33 are supported in suitable bearings as at 34 and 35 in Fig. 2, and extend through, and to the outside of the base beam 36 of the main frame structure, as has been shown best in Fig. 1. At their near ends, the shafts 15, 29 and 33, respectively, are equipped with driving sprocket wheels 38, 39 and 40, about which a driving chain belt 42 extends for the synchronous driving of the various shafts and the conveyor chain belts that are controlled thereby.

It is shown also, in Fig. 1, that the chain belt 42 operates about a driving sprocket wheel 43, that is fixed on a drive shaft 44. This latter shaft is mounted in the main frame structure, parallel with the shaft 33, and extends through and to the outside of the opposite base beams 36—36 of the main frame. This shaft is the main drive shaft of the machine and it is driven through the mediacy of a clutch mechanism designated generally in Fig. 1 by reference numeral 45. The function of this will be more fully disclosed in connection with the description of the various control mechanisms.

The clutch gear 45x is driven by a chain belt 46 operating about a sprocket wheel 47a on the drive shaft 47b of the motor unit, seen in Figs. 1 and 2.

Referring more particularly to Fig. 3 of the drawings, it will be observed that the three series of floor level conveyor belts 13, 25 and 26 by which the boxes are brought to and advanced into the machine, are spaced apart as at 48 and 49. This space between the successive series of belts is to accommodate the passage therebetween of the downwardly and upwardly moving box carrier clamps as carried by the paired box-elevating belts 50—50. These latter belts operate in parallel vertical planes, that are outwardly offset from the outer belts of those of the three series of conveyors as has been shown in Figs. 2 and 14.

By reference to Figs. 1, 3, 6 and 14, it will be understood that the box-elevating belts 50—50 operate at the lower ends of the downwardly traveling runs about sprocket wheels 51—51 on a cross shaft 53. This shaft is the drive shaft for the two belts and through it they are synchronized in travel. The upwardly traveling runs of the belts 50—50 pass around sprocket wheels 52—52 on stub shafts 54. At their upper ends, the paired belts operate over sprocket wheels 55 and 56 mounted on stub shafts 57 and 58 that are revolubly mounted in bearings 59 and 60 fixed to the side members of the main frame structure.

It is to be explained that by mounting these sprocket wheels 55 and 56 on the stub shafts, extended from the side frames, the space between the belts will be left open or unobstructed for the passage of the boxes and box carrier clamps as presently explained.

The downwardly traveling runs of the two belts 50—50 extend vertically between the sprocket wheels 51 and 55. The upwardly traveling runs extend directly upward from about sprocket wheels 52, within vertical guide channels 65 which are formed near their upper ends with gradually curved bends 65x leading into substantially horizontally directed guides from which the belts pass directly about the under sides of sprocket wheels 66 mounted on stub shafts 67 carried in bearings 68 fixed in the opposite side frames of the main frame structure.

The arrangement of the box elevating belts, the sprocket wheels about which they operate and the shafts associated therewith, as above described, is well shown in Figs. 3, 6 and 14, and the belts 50—50, which preferably are roller sprocket chains, travel in synchronism and in the direction indicated by the arrows adjacent thereto.

The particular machine or mechanism into which contents of the boxes are dumped forms no particular part of the present invention, but may be one of various types or forms. However, for explanatory purposes, I have shown in Fig. 1 a horizontally traveling belt conveyor 70 onto which the contents of the boxes are to be dumped. This belt operates at one end about a horizontal supporting roller 71 and the belt is driven in a manner to convey the contents of the boxes, as dumped thereinto, away from the machine; the elevation of the belt being somewhat below the horizontal guides 65x as observed in Fig. 1.

Located between the inner end of the conveyor system on which the boxes are brought into the machine and the inner end of the belt 70, as noted in Fig. 3, is a pair of vertically operating chain belts 75—75. These are arranged to follow along vertical guide rails or frames 76 and at their lower ends operate about sprocket wheels 77—77 that are fixed on the drive shaft 44 in alignment with the outer belts 26. The function of the belts 75—75 is, first, to stop the inward travel of the boxes, as advanced by the conveyor belts 25 and 26, and then to steady the boxes as they are lifted, and to regulate the rate of their turning toward an inverted position for the careful dumping of their contents, as will be understood by reference to Fig. 1. The location of the upper ends of these belts 75 bears a definite relationship to the path of travel of the box elevating belts, as determined by the curved guide rails 65x.

It is also shown in Figs. 1 and 6 that there are horizontally traveling belts 85—85 disposed in definite spacing below the upper horizontal runs of the elevating belts. Thse belts, designated as the back-feeding conveyors, operate along the top sides of horizontal rails 86 that are supported by transverse bars 87 fixed in the main frame structure. The belts extend about sprocket wheels 88 on a cross shaft 89, driven by a chain belt 90 operating about sprocket wheels 91 and 92 that are fixed on the shaft 89 and one of the stub shafts 57 as seen in Fig. 3.

It was previously stated that the series of conveyor belts, 13, 25 and 26, on which the boxes are brought into the machine, are driven by the chain belt connection 42 with the cross shaft 44. This shaft 44 extends through to the far side of the main frame structure, opposite that shown in Fig. 1, and is there equipped with a small sprocket wheel 95. Aligned with wheel 95, and to the left thereof in Fig. 1, is a relatively large sprocket wheel 96 and, to the right thereof, a somewhat smaller sprocket wheel 97. The wheel 97 is fixed on a short shaft 99 revoluble in bearing 100 that is fixed on the base frame beam 36', as noted in Fig. 2. Wheel 96, likewise, is fixed on a short shaft 101 revoluble in a bearing 102 fixed to the beam 36'. A sprocket chain belt 103 operates about the wheels 96 and 97 and over wheel 95, thus to drive the shaft 101. Fixed on the inner end of shaft 101 is a sprocket wheel 105 aligned with a sprocket wheel 106 on shaft 53, and a chain belt 108 is extended about these wheels, thus to complete the driving connection with the shaft 53, which, in turn, through the sprocket wheels 51, drives the paired box elevating belts 50—50.

The box carrier clamps which are associated with the belts 50—50 and whereby the boxes, as advanced against the belts 75—75, are picked up, dumped and carried to discharge position, are constructed in accordance with their showing in Fig. 10. All box carrying clamps are alike in construction and mode of use, and all are suspended between the belts 50—50 and are spaced therealong at regular and predetermined intervals.

Each carrier clamp comprises a horizontal cross-bar 110 with vertical, upwardly directed legs 111—111 at its opposite ends. Fixed to each leg at its outside edge, and about medially of its upper and lower ends, is a bracket 112 through which a pivot pin 113 is extended. These pins, in turn, are fixed to links of the corresponding belts 50—50 to pivotally suspend the clamp between the belts. Thus, with the travel of the belts, the carrier clamps are moved with them.

Mounted on each clamp bar 110, at its opposite ends, are bell-crank levers 115. Each lever, with respect to its showing in Fig. 10, comprises a vertically extending leg 115a that lies along the corresponding upwardly extending leg portion 111, and through which a pivot bolt 116 is extended to mount the bell-crank lever for pivotal action on the leg 111; the pivot bolts being applied through the legs 115a approximately halfway between their upper and lower ends. Each bell-crank lever also has a horizontally extending leg portion 115b at its lower end extended inwardly along the bar 110. These legs have downwardly and inwardly curved top edge surfaces 115x. At its lower end, and at the outer edge thereof, the arm 115a of each bell-crank lever, mounts a roller 120 for release of the clamp as presently explained.

Also pivotally mounted on each cross-bar 110, in association with the bell-crank levers 115 and inwardly thereof, are latch levers 125 of bell-crank form. Each lever is mounted by a pivot bolt 126 and is disposed with a horizontal leg portion 125a extended along and overlying the leg portion 115b of the corresponding bell-crank 115, and has a downwardly directed leg 125b formed at its lower end with an outwardly extended hook portion 128 designed to engage with the end of leg 115b of the corresponding bell-crank lever 115. Coiled springs 130 bear against lugs 131 on the bar 110 and against the legs 125b to yieldingly urge the latch levers 125 to the holding position relative to bell-crank levers 115 in which they are shown in Figs. 10 and 12.

Mounted on the upper ends of the leg portions 115a of the bell-cranks 115 are cross bars 134 equipped with inwardly directed pins 135 which, at their ends, are adapted to be pressed into the end walls of wooden boxes disposed within the box carrier clamp. The normal position of the various clamp and latch devices of the carrier clamp when not engaged in holding a box, is as shown in Fig. 10, wherein a box B is shown just prior to its being engaged by the cross bar 110 of the carrier.

Assuming that boxes have been brought into position as represented by boxes B1 and B2 in Fig. 1, and are being held against advancement by reason of the engagement of box B1 with the stops 20—20 on shaft 21, the operation of and means for admitting the boxes are as following, reference being directed to Figs. 1, 2 and 4: At its near end, as shown in Fig. 1, the shaft 21 has a latch plate segment 150 fixed thereto. This plate is formed with a peripheral notch 151. Fixed in the frame structure adjacent the latch plate is a standard 153 and pivoted to this by a pivot bolt 154 is a latch lever 155 which, at its outer end, has a toe 156 adapted to be engaged in the plate notch 151 as shown in Fig. 1, thus to hold the shaft against turning and thus to retain the stops 20—20 in box holding position as seen in Fig. 3.

Pivotally mounted on the upper end of the standard 153 by means of a pivot bolt 157 as shown in Fig. 4, is a lever 160, one end portion of which is connected by a link 161 with the latch arm 155 and its other is extended to a position close to and beyond the downwardly moving run of a belt 50. When the latch lever 155 is holdingly engaged with the segment 150, the parts assume the relationship of Fig. 1 and the boxes B1 and B2 are held against advancement. As the belts 50—50 move downwardly, the inner end of lever 160 will be engaged, with the passing of each box carrier clamp, by the clamp, and the lever will be rocked downwardly, thus moving the lever from the dotted-line position of Fig. 4 to the full-line position, thereby effecting the disengaging of the latch lever 155 from the segment 150 and thus allowing the shaft 21 to turn and to release the forward box from stops 20—20 for its advancement into the machine. The released box B1 is moved forwardly by conveyors 13 onto the conveyor belts 25, and then by them onto the belts 26 and comes to a stop against the vertically extending belts 75. The box, as stopped, assumes the dotted-line position of the box designated at B5 in Fig. 3.

As soon as the released box has cleared the stops 20—20, the shaft 21 is rotated back to starting position by the force of a coiled spring 162 that is applied about the outer end portion of the shaft (see Fig. 2), and is fixed at one end thereto and at its other end is fixed to the shaft mounting bearing. A stop 163 on the shaft engages the bearing to limit the return rotation of the shaft 21 so that the stops will be properly positioned.

The position that each box assumes relative to the conveyors 25 and 26 when advanced up against the pair of belts 75—75, is as shown in Figs. 3 and 13, wherein it is noted that the box is between the upwardly moving runs of the conveyor belts 50—50 and extends across the space between the adjacent ends of the belts 25 and 26 to more than half its width.

It will here be explained that the exact timing of the entry of each box into the machine is of significance because it must pass between carrier clamps first as it enters between the downwardly moving runs of the belts 50—50, then again as it moves to the stopped position against belts 75 and between the upwardly traveling runs of the belts 50—50.

It will further be explained that when the trip lever 160 is actuated to the full-line position of Fig. 4, to release the latch lever 155 from the segment 150, it also actuates mechanism to temporarily check advancement of the box B2. This mechanism, shown in Figs. 1, 2 and 3, comprises a cross shaft 165 which extends beneath the box carrying runs of the conveyor belts 13, and is equipped with a pair of arms 166 extended in the direction of travel of the boxes. These arms are equipped at their ends with upwardly extended pins 167 adapted to engage with the bottom wall of the box. At its outer end, the cross shaft has a lever arm 168 fixed thereto, and connected with this arm is a link 169 which, at its other end, is pivotally connected to the near end of lever 160; the connections being such that with the actuation of the lever 160 to release the forward box B1, the shaft 168 is so rotated as to swing the arms 166 upwardly as from full-line to dotted-line position of Fig. 3, thus to engage the box B2 with the points and hold the box against advancement. As soon as the lever 160 is disengaged from the bracket 112 moving with the belt 50, the parts are returned to normal position of Fig. 1, and the box B2 is released for advancement up to the stops 20—20.

Immediately after a box has been advanced to the position of box B5 in Fig. 3, where it is stopped by its engagement against the vertical runs of belts 75—75, across the interval between the series of belts 25 and 26, as in Fig. 13, it is then engaged by an upwardly moving box-carrier clamp. The relationship of the box to the carrier clamp and the conveyor belts 50—50 just prior to the engagement of the box by the clamp is shown in Fig. 10. It is therein shown that the box is symmetrically located between the belts 50—50 and the leg portions 115a of the bell-crank levers 115 are inclined outwardly away from the box end walls and the pins 135 are in the clear thereof. Also, it is noted that the lever arms 125a of the latch levers 125 extend above the top edge of the cross bar 110, and their hooked ends of arms 125b are engaged with the legs 115b of the levers 115 to hold the latter in the position shown.

Assuming the box to be at rest in Fig. 10, and the belts 50—50 to be moving upwardly, the bottom wall of the box will first be engaged by the latch lever arms 125a. This causes the latch levers to be so actuated as to release their hooked ends 128 from the bell-crank legs 115a as in Fig. 11. The full weight of the box and its contents is then applied through the levers arms 125a to the bell-crank legs 115b and the bell-cranks are thus actuated on the pivot bolts 116 to position of Fig. 11, causing the pivot pins 135, carried by the arms 115a, to be projected into the end walls of the box. The box then rests upon the cross-bar 110 and as it is lifted by the upwardly traveling belts it is held against lateral dumping by reason of its engagement with the conveyor belts 75—75.

As the belts 50—50 move upwardly, the box is lifted thereby along the guide rails 65. It is shown in Figs. 1 and 3 that as the conveyor chains 75—75 lead upwardly from the sprocket wheels 77 they are gradually inclined away from the vertical line of travel of belts 50—50 and therefore, by reason of the unbalanced suspension of the box between the belts, the box is allowed to tilt laterally, passing gradually through the position of the box B6 in Fig. 1, then up and over the upper ends of the belts 75—75.

With the provision that the carrier clamps are pivotally suspended between the belts 50—50, it will be understood that as a box is lifted by the belts above the top ends of the conveyors 75, the side wall of the box will slide across the top ends of the belts, and the box will swing toward inverted position and its contents will be poured therefrom onto the conveyer belt 70. The inverting of the box is made gradual and progressive and therefore its contents will be poured out carefully and progressively and the likelihood of bruising the fruit is reduced to a minimum and piling up on the conveyor is avoided.

The emptied box is then lifted from full-line position of Fig. 6, through the dotted-line position B7 and to the position B8, and is there released from the carrier clamp and dropped onto the conveyor chains 85.

In this connection, it will be explained that as the emptied and inverted box moves upwardly, from the full-line position of Fig. 6 to the dotted-line position B7, the cross-rail of its carrier clamp 110 is upwardly directed, and it is caused to be brought into engagement at one end with a horizontal rail 175 that is fixed in the frame structure to extend along the adjacent horizontal run of a belt 50. This swings the clamp to a horizontal position. Then as the box, moving with the belts 50—50, reaches a position for release, the rollers 120 that are mounted on the lower corners of the bell-cranks 115 of the carrier clamp, are caused to engage in rolling contact with cam rails 176 fixed to the opposite side frames in position as indicated in Figs. 2 and 12, and the bell-cranks 115 are thereby caused to be rocked to box release position and held there by the latch levers 125. The released box then drops onto the belts 85 and is advanced thereby up against the upturned ends 178' of a pair of latch fingers 178, serving as a gate to time the discharge of the box to the off-bearing conveyor. When a box is thus stopped, it assumes the dotted-line position of the box B9, in Fig. 6, where it is held until the carrier clamp from which it was released has advanced to a position that is in the clear of the box discharge passage.

The two latch fingers 178 are fixed to a cross shaft 180 that extends beneath and transversely of the conveyor belts 85—85 and is revolubly supported in bearings 181 fixed to a cross bar 87, as shown in Figs. 6 and 9. The fingers 178 are counter-weighted by weight 183, shown in Fig. 9, and normally held thereby in box-engaging position. A trip lever 185 extends from cross-shaft 180 to a position along side of one of the downwardly traveling runs of belts 50, to be engaged by the box carrier clamp as it moves downwardly, as has been shown in Figs. 6 and 9, thus to rock the lever and rotate the cross shaft to cause a downward swing of the fingers 178 for release of the temporarily held box; this releasing operation being in proper timing with the position of the carrier clamp 110 so that the box will not engage therewith, nor will it be engaged by the next oncoming clamp.

Upon its release, the box will be discharged by the belts 85 into a chute 188 and onto on off-bearing conveyor belt 190 carried by a roller 191 as seen in Fig. 1, and thus conveyed from the machine to a place for re-use if desired.

The power unit 47 for the machine is electrically energized through circuit connections not shown, and is started and stopped by a control switch, located at any convenient place, for example, by the pushbutton switch 192 fixed to one of the side frame members of the machine, as seen in Fig. 1. With the motor in operation, the machine is driven through the belt 46 and clutch 45.

The clutch 45 may be operatively engaged to drive the shaft 44 by the shifting of a hand lever 193, shown in Fig. 1, from "off" to "on" position. The clutch is spring loaded and is normally held in "on" position against the spring load by means of a bell-crank form of latch lever 194, pivoted on the main frame as at 195, in position to engage with the lever. The bell-crank latch may be mechanically released by the energization of a solenoid 196 mounted on the frame structure as noted in Fig. 1 and having its core bar 197 operatively connected with the latch lever. This solenoid is comprised in a mechanism for the automatic stopping of the machine as will now be described.

First, it will be explained that the power unit 47 is fixed on a base plate 196 that is slidably mounted in the main frame structure for horizontal movement, to limited extent, from and toward shaft 44, and is yieldingly held at its outer limit, by pressure of one or more coiled springs 198, as shown in Fig. 1, arranged to press against laterally extended and depending wings or flanges 200 on the base of the unit. When the belt 46 is placed under excessive driving strain, such as would occur if a box became jammed in the machine, the power unit is moved forwardly and a lug 205 on the forward edge of the plate 195 is caused to engage and close a micro-switch 206, shown in Fig. 1, thus to close an electric circuit through the solenoid 197, which operates upon being engaged to rock the lever 194, thus to release the clutch control lever 193 and thus disengage the clutch to stop the driving of the main shaft 44.

Another condition that would require the stopping of the machine would result from an entering box becoming out of position, such as for example, if turned angularly on the conveyor belts 26. To take care of this and like conditions, I provide the following mechanisms:

It is shown in Fig. 3 that a micro-switch, designated at 210, is located between and below the conveyor belts 25 and is adapted to be actuated from open to closed position by a weighted lever arm 212 that is pivoted on the switch support, with one end portion extended to a position to be engaged by advancing boxes when passing through the position of box B5 in Fig. 3, thus to rock the lever to close the switch when the lever is held down. Also, located adjacent the belts 75—75 is a normally closed micro-switch 215 adapted to be actuated by a switch lever 216 that is pivoted on a support 217 and is so positioned as to be engaged by the forward vertical wall of box B5 when it is brought up against the belts 75, and thus actuated to hold the switch 215 open until the lever is disengaged.

A third micro-switch, 220, normally open, is located at the side of one of the upgoing runs of belts 50, as noted in Fig. 2, and this is adapted to be closed by a switch lever 221 that is pivoted on a stationary support in position to be engaged by each of the box carrier frames 110, as they are successively brought to position for lifting a box from its position of rest as advanced against the belts 75—75. The arrangement of the three micro-switches 210, 215 and 220 is as in Figs. 2 and 3, and the circuit connections are as in Fig. 5, wherein power circuit lines 230—231 lead to the controlling solenoid 210; the wire 230 being connected through the micro-switch 206, which is normally open. The micro-switches 210, 215 and 220 are connected in parallel to wire 230 across the switch 206.

Solenoid 197 is normally de-energized. Switch 210 is normally open. Switch 215 is normally closed and switch 220 is normally open. Therefore, when a box moves to position up against belts 75—75, as box B5 is shown in Fig. 3, it closes switch 210 and opens switch 215. However, if the box is out of position, for example, if angularly located, it will not properly contact switch lever 216 and switch 215 will remain closed. Then, as the box carrier clamp 110 moves up to engage the out-of-position box, it first engages switch lever 221 and closes switch 220, thereby closing the solenoid circuit to effect the energization of the solenoid and the disengaging of the clutch, thereby stopping the machine. Upon movement of the box to proper position, switch 215 will be opened, and then with the manual resetting of the clutch 45, the operation will be resumed.

In case of any excessive load being placed on the motor, such as might occur if a box became jammed in the conveyor mechanism, the overload will cause the inward shifting of the motor and the incident closing of switch 206 to energize the solenoid 197 and cause the releasing of the clutch 45.

In the following claims, the station at which the box is stopped for pickup by the box carrier clamps will be referred to as the "pickup" station; the belts 75—75, unless otherwise designated, will be designated as "guides" or "supporting guides," and the belts 85 will be referred to as "back-feeding" conveyors.

Having thus described my invention, what I claim as new therein and desire to secure by Letters Patent is:

1. In a machine of the character described, a continuously moving conveyor belt operable for the conveyance of boxes thereon from a source of supply, a gate mechanism comprising a revolubly mounted shaft extending transversely of and below said belt, arms extended from said shaft and adapted to check the advancement of boxes by the conveyor, a latch plate fixed on the shaft, a pivoted latch lever arranged to engage the plate to hold the shaft against rotation and the gate in closed position, a pivotally mounted control lever operatively connected with the latch lever and operable to disengage said latch lever from the said plate to permit gate opening rotation of the shaft, a box restraining means located back of the gate, comprising a revolubly mounted cross shaft below the conveyor belt, arms fixed thereto and adapted to be swung into holding contact with advancing boxes, an actuating lever arm for said cross shaft and means connecting the said lever arm with the said control lever whereby the cross shaft is rotatably actuated to cause the said box engaging arms to be swung into box restraining position with the opening of the said gate to prevent advancement of boxes back of that immediately adjacent the gate when it is opened.

2. In a machine of the character described, in combination, a continuously moving box elevating conveyor comprising a pair of spaced, parallel and synchronously moving belts, and box carrier clamps suspended by and between said belts at spaced intervals therealong; said conveyor having a horizontal run continuing into a downwardly directed run, a continuously moving belt conveyor for the back feeding of boxes, located below the said horizontal run of the first conveyor and directed through the said downwardly directed run of the box elevating conveyor; said carrier clamps being adapted to convey boxes therein through a dumping position and over said back-feeding belt conveyor, means for effecting the release of boxes from the carrier clamps onto the back-feeding conveyor, a gate associated with the back-feeding conveyor for checking the advancement of boxes thereby and means on the box elevating conveyor for actuating said gate to open position in timing with the passing of box carrier clamps for the timed delivery of boxes through the downwardly traveling run of the belt between successively passing carrier clamps.

3. In a machine of the character described, a traveling conveyor comprising spaced, parallel belts moving in unison, and box carrier clamps supported between said belts to move therewith, each comprising a horizontal cross bar with upwardly directed legs at its ends, bell crank levers at opposite ends of the cross bar, each having a vertical arm extended along the corresponding leg and pivoted thereto for the inward and outward rocking of the bell crank, and having its other arm extended along the cross bar, spring means acting on the bell crank levers to actuate their upwardly directed arms apart for the receiving of a box between them, as the carrier moves upwardly, latch levers pivoted on the cross bar to lockingly engage with the said other arms of the bell cranks to hold the vertical arms in box-receiving position; said latch levers having arms extended therefrom to position for engagement by a box upon its being received in the carrier, to release the latches and to engage and actuate the bell crank levers to cause their vertical arms to move into the box clamping position.

4. A machine as in claim 3 wherein the said vertical arms of the bell crank levers are equipped with pins at their upper ends for holding contact with the opposite end walls of a box received in the carrier clamp, when the lever arms are closed thereagainst, and are equipped at their lower ends with camming means for engaging stationary stops to actuate the bell cranks to open position, and to functionally engage the latch levers therewith.

5. In a machine of the character described, the combination with conveyor means for advancing boxes to a pick-up station, a stop at which the advanced boxes are caused to engage to check their advancement at the pickup station, and a box elevating conveyor, a driving means for the conveyors including a releasable clutch, a normally de-energized solenoid operable upon being energized, to disengage the clutch, an electric circuit for the solenoid, a normally closed switch in the circuit adapted to be opened by a box upon its being properly advanced into the pickup station, a normally open switch in the circuit and means on the box elevating conveyor for momentarily closing the said switch when the box elevating conveyor is in position to pick up the advanced box.

6. In a machine of the character described, the combination with conveyor means for advancing boxes to a pick-up station, a stop at which the advanced boxes are caused to engage to check their advancement at the pickup station, and a box elevating conveyor, a driving means for the conveyors including a releasable clutch, a normally de-energized solenoid operable upon being energized, to disengage the clutch, an electric circuit for the solenoid, a normally open switch and a normally closed switch in the circuit adapted to be reversed in setting upon the proper positioning of a box in the pick-up station, and another normally open switch in the solenoid circuit, and means on the box elevating belt for momentarily closing it when the box elevating conveyor is in position to pick up the advanced box.

References Cited in the file of this patent

UNITED STATES PATENTS

| | | |
|---|---|---|
| 1,049,523 | Parker | Jan. 7, 1913 |
| 1,290,675 | Stebler et al. | Jan. 7, 1919 |
| 1,461,638 | Wells et al. | July 10, 1923 |
| 1,907,456 | Stevenson | May 9, 1933 |
| 2,193,264 | Bashore | Mar. 12, 1940 |
| 2,459,204 | Van Vleck | Jan. 18, 1949 |